Figure 1:
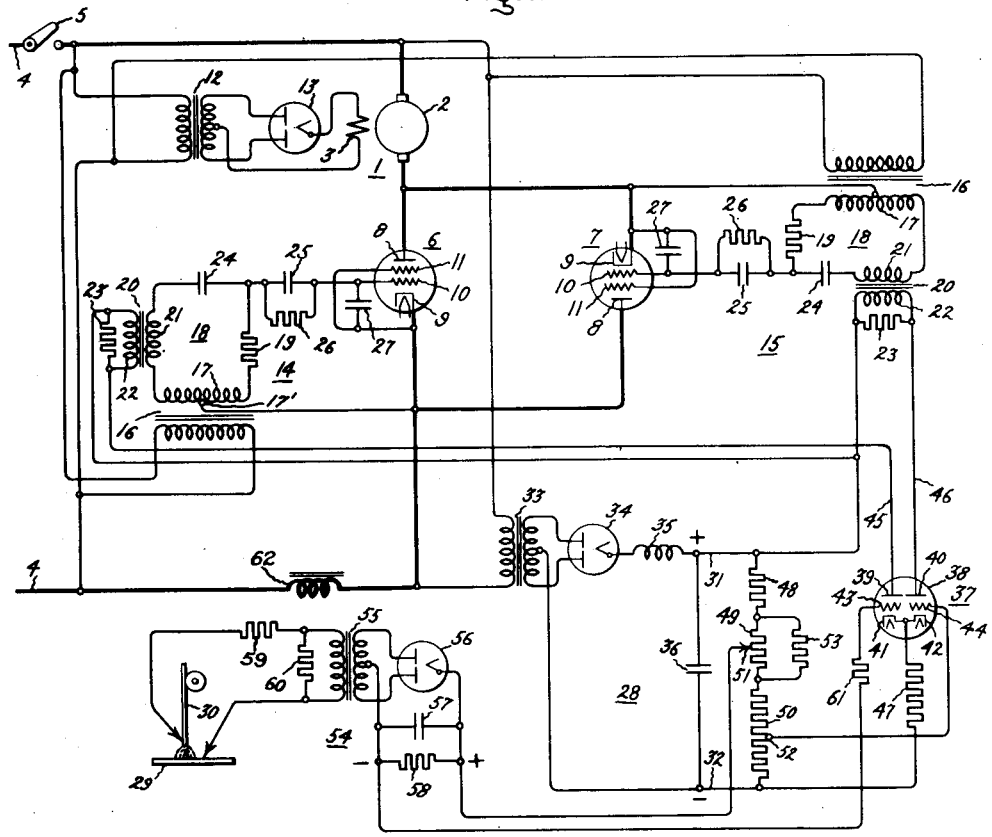

Oct. 3, 1939.  W. D. COCKRELL  2,175,017

ELECTRIC CONTROL CIRCUIT

Filed July 24, 1937

Inventor:
William D. Cockrell,
by Harry E. Dunham
His Attorney.

Patented Oct. 3, 1939

2,175,017

UNITED STATES PATENT OFFICE 2,175,017

ELECTRIC CONTROL CIRCUIT

William D. Cockrell, Schenectady, N. Y., assignor to General Electric Company, a corporation of New York Application July 24, 1937, Serial No. 155,509

19 Claims. (Cl. 250—27)

My invention relates to electric control circuits and more particularly to circuits for controlling electric valve apparatus.

In many control systems there is need for apparatus which controls the energization of control circuits in accordance with a predetermined controlling influence, such as an electrical condition of an associated circuit or apparatus, or in accordance with an operating condition of a dynamo-electric machine to accomplish a desired controlling operation. For example, in control systems for electric motors it is frequently desirable to control the speed of the motor, as well as the direction of rotation of the motor, in accordance with a predetermined operating condition or electrical condition, or in accordance with a controlling influence derived from apparatus actuated by or associated with the motor. Furthermore, in electric control and regulating systems, such as voltage regulating systems, it is frequently desirable to control the magnitudes of currents in the control circuits in accordance with the voltage of an associated circuit or apparatus to effect the desired controlling or regulating operation.

It is an object of my invention to provide a new and improved electric control system.

It is a further object of my invention to provide a new and improved electric valve voltage responsive circuit.

It is a further object of my invention to provide a new and improved electric valve control system for dynamo-electric machines.

It is a still further object of my invention to provide a new and improved voltage sensitive electric valve control system for controlling the energization of other electric valve apparatus.

In accordance with the illustrated embodiment of my invention, I provide a new and improved electric valve control system for dynamo-electric machines in which the speed of the machine and the direction of rotation are controlled by electric valve apparatus. The electric valve apparatus is controlled by an electric valve control system which is responsive to a controlling influence, such as a voltage, which is responsive to an operating condition or an electrical condition of the dynamo-electric machine. More particularly, the voltage sensitive circuit comprises an electric valve means of the vacuum type comprising a pair of electric discharge paths each having a control member. I also provide a pair of circuits each associated with a different one of the discharge paths and which are energized from a source of direct current through the discharge paths. An impedance element is connected in series relation with the pair of circuits and the discharge paths. A substantially constant unidirectional potential is impressed on one of the control members and a variable unidirectional potential is impressed on the other control member to control the currents in the pair of electric circuits in accordance with the predetermined controlling influence.

For a better understanding of my invention, reference may be had to the following description taken in connection with the accompanying drawing and its scope will be pointed out in the appended claims.

Figure 2:
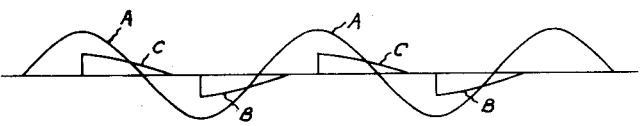
Figure 3:
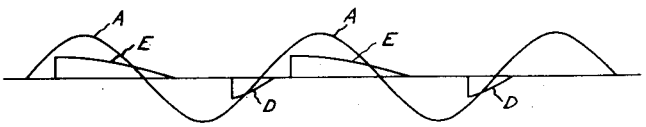

Fig. 1 of the accompanying drawing diagrammatically illustrates an embodiment of my invention as applied to a motor control system for arc welding apparatus, and Figs. 2 and 3 represent certain operating characteristics thereof.

In Fig. 1 of the accompanying drawing my invention is diagrammatically illustrated as applied to an electric valve control system for energizing a translating device such as a dynamo-electric machine or motor 1 of the direct current type, having an armature member 2 and a field winding 3, from an alternating current circuit 4. The motor 1, of course, constitutes the load circuit which is controlled. A suitable circuit controlling means, such as a switch 5, may be provided to connect and disconnect the motor 1 from the alternating current circuit 4. In order to control the direction of rotation of the armature 2 of machine 1 and to control the speed of rotation of the armature 2, I provide a pair of oppositely disposed electric valve means 6 and 7, preferably of the type employing an ionizable medium such as a gas or a vapor, and each including an anode 8, a cathode 9 and a control member 10. The electric valve means 6 and 7 may also be provided with an additional control member 11 which may be connected to the cathode 9 or to a potential less positive than that of the anode 8. The electric valve means 6 and 7 are connected reversely in parallel to conduct current in opposite directions through armature member 2 of machine 1.

To energize field winding 3 of dynamo-electric machine 1 I may employ any suitable source of direct current, and in the arrangement shown in Fig. 1 I have chosen to illustrate this source as comprising a transformer 12 connected to circuit 4 and a suitable full wave rectifier 13. It is to be understood that I may employ other suitable arrangements for supplying direct current to the field winding 3.

I provide excitation circuits 14 and 15 associated with electric valve means 6 and 7, respectively, to impress alternating voltages which are variable in phase on control members 10 thereof to control the conductivities of these electric valve means. The excitation circuits 14 and 15 are similar in construction and arrangement and, for the purpose of description, excitation circuit 14 will be considered in particular. Excitation circuit 14 includes a transformer 16 energized from circuit 4, and provided with a secondary winding 17 having an electrical neutral connection 17' which is connected to cathode 9 of electric valve 6. Transformer 16 serves to provide an alternating voltage for energizing excitation circuit 14. The output of the winding 17 is connected to a phase shifting circuit 18 comprising a resistance 19 and a variable inductive element 20 which may be saturable and which may comprise a winding 21 of variable inductance and a control winding 22 which may control the saturation of the element 20 and hence control the inductance of winding 21. A resistance 23 may be connected across the terminals of control winding 22, and, if desired, a capacitance 24 may be connected in series relation with the inductive winding 21 to provide additional phase displacement of the alternating voltage impressed on control member 10. A parallel connected capacitance 25 and a resistance 26 are connected in series relation with the control member 10 of electric valve 6 and the phase shifting circuit 18 and serve as a self-biasing means to impress on control member 10 a negative unidirectional biasing potential. A capacitance 27 may be connected across control member 10 and cathode 9 of electric valve 6 to absorb extraneous transient voltages which may be present in the excitation circuit 14.

As an agency for controlling the excitation circuits 14 and 15 and for controlling the currents conducted by electric valve means 6 and 7 in accordance with a predetermined controlling influence variable in accordance with an electrical or operating condition of the dynamo-electric machine 1, I provide a voltage sensitive circuit 28. In the particular arrangement shown in Fig. 1, the controlling influence is the arc voltage between a work member 29 and a welding electrode 30. The electrode 30 is actuated by the dynamo-electric machine 1 through mechanism not shown, and the rate at which the electrode 30 is fed to the work 29 is dependent upon the speed of the dynamo-electric machine 1. Furthermore, since the dynamo-electric machine 1 is reversible, the arc length is controllable in accordance with the arc voltage. The voltage sensitive circuit 28 includes a source of direct current comprising conductors 31 and 32 which are energized from any suitable source such as a transformer 33 which is energized from the alternating current circuit 4 and a suitable full wave rectifier 34. A smoothing reactor 35 may be connected in series relation with the rectifier 34, and a capacitance 36 may be connected across the conductors 31 and 32 to maintain the voltage appearing across these conductors at a substantially constant value.

An electric valve means 37, preferably of the high vacuum type, is included in the voltage sensitive circuit 28 and comprises an envelope 38 and a pair of electric discharge paths including anodes 39 and 40, cathodes 41 and 42 and control members or grids 43 and 44. Although the electric valve means 37 is shown as being of the type in which both electric discharge paths are enclosed within the same envelope, it is to be understood that I may employ a pair of electric discharge paths each mounted within a separate envelope, and that the cathodes thereof may be connected together. The cathodes 41 and 42 are connected together and the anodes 39 and 40 are connected to a pair of circuits including conductors 45 and 46, respectively. Conductor 45 transmits unidirectional current to control winding 22 of the saturable inductive device 20 in excitation circuit 14, and conductor 46 transmits unidirectional current to control winding 22 of the saturable inductive device 20 in excitation circuit 15. A suitable impedance member such as a resistance 47 is connected to the cathodes 41 and 42 and in series relation with both of the electric discharge paths of electric valve means 37 and serves to control the potential of the cathodes in accordance with the sum of the currents conducted by the discharge paths. A voltage divider, including serially connected resistances 48, 49 and 50, is connected across the direct current source including conductors 31 and 32. The resistance 49 is provided with an adjustable contact or tap 51 and the resistance 50 is provided with a tap 52 which is connected to control member 44 of electric valve means 37. The potential impressed on control member 44 is one of substantially constant value. A suitable resistance 53 may be connected across the resistance 49 if desired to afford a finer adjustment.

To impress on control member 43 a potential which varies in accordance with a predetermined controlling influence, such as the voltage appearing between the electrode 30 and the work 29, I provide a circuit 54 including a transformer 55, a full wave rectifier 56, a capacitance 57 connected in parallel across the output circuit of the rectifier 56, and a resistance 58. A current limiting resistance 59 may be connected in series relation with the primary winding of transformer 55 and a resistance 60 may be connected in parallel relation therewith. The voltage appearing across the terminals of resistance 58, due to the conduction of unidirectional current therethrough, will vary in accordance with the arc voltage, and the voltage appearing across resistance 58 is combined with an opposing component of unidirectional voltage derived from a portion of the voltage divider including a part of resistance 49 and resistance 50. A suitable current limiting resistance 61 may be connected in series relation with the control member 43 of electric valve 37. The tap 51 is preferably adjusted so that when the arc voltage is at its predetermined desired value, the voltage provided by the resistance 58 is slightly greater than the voltage provided by the lower portion of the voltage divider. Since the voltage appearing across the terminals of resistance 58 opposes that obtained from the lower portion of the voltage divider, the net potential impressed on control member 43 will be negative relative to the potential of cathode 41.

While I have chosen to represent the voltage sensitive circuit 28 as being responsive to the arc voltage appearing between the electrode 30 and the work 29, it is to be understood that my invention in its broader aspects may be applied to a control system in which any other controlling influence is employed.

I connect a self-saturating inductive reactance 62 in series relation with the electric valve means 6 and 7 and armature 2 of machine 1 to serve as a protective device to limit the current when the machine 1 is at standstill. Under this condition, electric valves 6 and 7 conduct opposing currents for equal fractions of a cycle and the reactance 62 will be unsaturated and the impedance thereof will be greater than when electric valves 6 and 7 conduct for different fractions of a cycle. Under the latter condition, the preponderance of current flow in one direction effects saturation of the reactance 62 and, of course, reduces the impedance thereof. In this manner, I provide a protective arrangement to limit the current through armature 2 during standstill and which decreases in impedance when the machine rotates, thereby avoiding material voltage drop through the reactance 62 when machine 1 is operating.

The operation of the embodiment of my invention diagrammatically illustrated in Fig. 1 will be explained when the control system is operating to feed the electrode 30 to the work 29 and when the system is responding to maintain the arc length, and hence the arc voltage, at a predetermined value. The switch 5, of course, is moved to the closed circuit position to impress across anodes 8 and cathodes 9 of electric valve means 6 and 7 alternating voltages through the armature 2 of the dynamo-electric machine 1. Since the electric valve means 6 and 7 are reversely connected in parallel, these electric valves conduct current in opposite directions through the armature member 2 of machine 1. The excitation circuits 14 and 15 are arranged so that when the saturable inductive devices 20 are unsaturated, the voltages impressed on the control members 10 of electric valves 6 and 7 are substantially 180 electrical degrees out of phase with respect to the voltages impressed across the associated anodes 8 and cathodes 9. As is well understood by those skilled in the art, the electric valves 6 and 7 are rendered conductive when the potential impressed on the control members 10 exceeds a predetermined critical value and that the electric valves continue to conduct current for the remaining portion of the positive half cycle and for a predetermined length of time thereafter, depending upon the power factor of the load circuit. In the illustrated embodiment of my invention, the conducting period for electric valves 6 and 7 may be less than one-half cycle due to the counter-electromotive force of the motor 2. When there is substantial phase opposition between the voltages impressed on the control members 10 and the voltages impressed on the anodes 8, the average current conducted by the electric valve means is substantially zero, and when there is phase coincidence between the voltages impressed on the control members and the anodes, the average current conducted by the electric valve is maximum. For intermittent phase relationships between these voltages, the current conducted by the electric valve assumes corresponding intermediate values. As the saturable inductive devices 20 are saturated by the direct current supplied to control windings 22, the phase of the alternating voltages impressed on control members 10 is advanced.

The tap 51 of the voltage divider is adjusted so that the potential impressed on control member 43 is slightly negative when the arc voltage is of a predetermined value. Of course, the potential impressed on control member 44 remains constant and is slightly negative. For a balanced condition, that is, when the arc voltage is of a predetermined value, the potentials impressed on control members 43 and 44 are equal and both slightly negative so that the currents conducted by the parallel paths are equal in value, supplying equal currents to control windings 22 of saturable inductive devices 20. The excitation circuits 14 and 15 are adjusted so that the motor 1 is at standstill when the arc voltage is at its predetermined value. To effect this control, electric valve means 6 and 7 each conduct current for a corresponding interval of time during each half cycle of applied voltage. Referring to the operating characteristics shown in Fig. 2, the curve A represents the alternating voltage of circuit 4 and may be employed to represent the alternating voltage impressed across anode 8 and cathode 9 of electric valve 7. Curves B represent the currents conducted by electric valve 6 and curves C represent the currents conducted by electric valve 7. Since the average value of the currents conducted by electric valves 6 and 7 are equal and since these currents are opposing the net value of the average current conducted through armature 2 of machine 1 is zero and the machine is maintained at standstill.

For the purpose of explaining the operation of the voltage sensitive circuit 28, let it be assumed that the voltage appearing between the conductors 31 and 32 is substantially 300 volts and that the value of the resistance 47 is 50,000 ohms. Furthermore, let it be assumed that under the balanced condition the potentials impressed on the control members 43 and 44 are minus 1.5 volts. In addition, let it be assumed that the electric valve 37 is designed so that under these conditions the currents in the conductors 45 and 46 are each one milliampere. Under this condition of operation, the drop across the terminals of resistance 47 will be 100 volts. If the arc length increases, effecting an increase in arc voltage, the voltage appearing across the terminals of resistance 58 will also increase, increasing in a negative direction the voltage impressed on control member 43. By the proper choice of an electric valve of the desired characteristics, this negative increase in voltage may be employed to render the associated discharge path completely nonconductive. By virtue of the temporary decrease in current through the resistance 47, the cathode 42 will become more negative in potential than that under the balanced condition to cause this electric discharge path to conduct an increased amount of current. The sum of the currents in the two discharge paths always remains at a substantially constant value, differing only by the small difference required to change the voltage across resistance 47 as the cathodes 41 and 42 change in potential, with respect to the fixed control member 44, to achieve a balanced condition. Under this particular condition, the voltage drop across the resistance 47 may be considered to be 98.5 volts and the current conducted by the discharge path associated with control member 44 may be considered as being 1.97 milliamperes. By virtue of the increase of current in conductor 46, inductive device 20 in excitation circuit 15 will be saturated to effect an advance in phase of the alternating voltage impressed on the control member 10 of electric valve 7, causing the machine 1 to rotate in a direction to decrease the arc length and to restore the arc voltage to the predetermined value. In addition, the phase of the alternating voltage impressed on control member 10 of valve 6 will be retarded in phase due to the decrease of the current in conductor 45. This condition of operation is represented by the curves of Fig. 3 where curve D represents the decreased current conducted by electric valve 6, and curve E represents the increased current conducted by electric valve 7. By virtue of this unbalanced condition, the dynamo-electric machine 1 is energized to move the electrode 30 in a direction to decrease the arc length.

When the arc length decreases, the voltage appearing across the terminals of resistance 58 will decrease correspondingly to increase in the positive direction the potential impressed on control member 43 so that the discharge path associated with control member 43 conducts an increased amount of current slightly greater than the sum of the currents during balanced condition, and the discharge path associated with control member 44 conducts substantially no current. As a result, the phase of the voltage impressed on control member 10 of electric valve 7 will be retarded to decrease the current conducted thereby, and the phase of the voltage impressed on control member 10 of electric valve 6 will be advanced to increase the current conducted thereby. The net current conducted by armature 2 of machine 1 under these conditions will be in a direction to move the electrode 30 away from the work 29 to increase the arc length and to restore the arc voltage to the predetermined value. Under this last mentioned condition, the current conducted by the discharge path associated with control member 43 may be 2.03 milliamperes, and the voltage drop across the resistance 47 will be 101.5 volts, the sum of the currents through the two paths remaining substantially constant and differing only by the small difference required to change the voltage across resistance 47 as the cathodes 41 and 42 change potential, with respect to the fixed control member 44, to achieve a balanced condition.

It is to be understood that the control system responds not only to control the direction of rotation of the dynamo-electric machine 1, but also responds to control the speed of the machine 1 during the adjusting operation by virtue of the control of the direction and magnitude of the resultant current conducted to the armature 2 by electric valves 6 and 7.

An important advantage of my invention is the feature thereof which serves to protect the system in the event the voltage sensitive circuit becomes defective. For example, if the electric valve means 37 becomes inoperative, occasioned by accidental breakage of the envelope 38, the electric valves 6 and 7 automatically become non-conductive since the excitation circuits 14 and 15 are biased so that the voltages impressed on the control members are 180 electrical degrees out of phase with the respective anode voltages. This protective feature is accomplished by virtue of the fact that the excitation circuit voltages are 180 degrees out of phase when the saturable inductive devices 20 are unsaturated. As soon as the electric valve means 37 ceases to conduct current, the circuits including conductors 45 and 46 are immediately deenergized and the saturable inductive devices 20 are restored to the unsaturated condition.

A further advantage of my invention resides in the employment of a saturable inductive device 62 which limits the current through the electric valves 6 and 7 and the armature 2 of machine 1 when the machine is at standstill. When the currents conducted by the electric valves 6 and 7 are equal, the impedance of the inductive reactance 62 is maximum. On the other hand, when the electric valves 6 and 7 conduct the unequal amounts of current to effect rotation of the machine 1, the saturable inductive reactance 62 is saturated by virtue of a preponderance of current flow in one direction, and the impedance thereof decreases correspondingly so that there is no substantial voltage drop across the saturable inductive device.

While I have shown and described my invention as applied to a particular system of connections and as embodying various devices diagrammatically shown, it will be obvious to those skilled in the art that changes and modifications may be made without departing from my invention, and I, therefore, aim in the appended claims to cover all such changes and modifications as fall within the true spirit and scope of my invention.

What I claim as new and desire to secure by Letters Patent of the United States is:

1. In combination, a source of current, an electric valve means having a pair of simultaneously conducting electric discharge paths and a pair of control members each associated with a different one of said paths, a pair of electric circuits connected to be energized from said source and each being associated with a different one of said paths, an impedance element connected in series relation with both of said paths, and means responsive to a component of voltage derived from said impedance element for impressing relatively variable potentials on the respective control members for controlling the currents in said pair of circuits.

2. In combination, a source of current, an electric valve means having a pair of electric discharge paths and a pair of control members each associated with a different one of said paths, a pair of electric circuits connected to be energized from said source and each being associated with a different one of said paths, an impedance element connected in series relation with both of said paths, means for impressing on one of said control members a substantially constant potential, and means for impressing a potential on the other of said control members to control the currents in said pair of circuits in accordance with a predetermined controlling influence.

3. In combination, a source of direct current, an electric valve means having a pair of electric discharge paths and a pair of control members each associated with a different one of said paths, a pair of electric circuits connected to be energized from said source and each being associated with a different one of said paths, an impedance element connected in series relation with both of said paths, means for impressing on one of said control members a substantially constant potential, and means for impressing on the other of said control members a unidirectional potential which varies in accordance with a predetermined controlling influence to control the magnitudes of the currents in said pair of circuits.

4. In combination, a source of direct current, an electric valve means comprising an envelope and a pair of electric discharge paths each including an anode, a cathode and a control member, said cathodes being connected together, a pair of electric circuits each being connected to a different anode of said electric valve means, a resistance connected to said cathodes and in series relation with said discharge paths, a voltage divider connected to said source for impressing on one of said control members a unidirectional potential of substantially constant value, and means comprising a portion of said voltage divider for impressing on the other of said control members a unidirectional potential which varies in accordance with a predetermined controlling influence to control the currents in said pair of circuits.

5. In combination, a source of direct current, an electric valve means having a pair of electric discharge paths each including an anode, a cathode and a control member, the cathodes being connected together, a pair of electric circuits connected to be energized from said source and each being associated with a different one of said paths, means for impressing on one of said control members a substantially constant potential, means for impressing on the other of said control members a potential which varies in accordance with a predetermined controlling influence, and means comprising an impedance element connected in series relation with said paths and being connected to the cathodes to control the potential thereof.

6. In combination, a source of direct current, an electric valve means having a pair of electric discharge paths and a pair of control members each associated with a different one of said paths, a pair of electric circuits connected to be energized from said source and each being associated with a different one of said paths, an impedance element connected in series relation with both of said paths, means for impressing on one of said control members a substantially constant potential, and means for impressing on the other of said control members a potential which varies in accordance with a predetermined controlling influence to maintain the sum of the currents in said pair of paths at a substantially constant value.

7. In combination, a source of direct current, an electric valve means having a pair of electric discharge paths and a pair of control members each associated with a different one of said paths, a pair of electric circuits connected to be energized from said source through a different one of said paths, an impedance element connected in series relation with both of said paths, means for impressing on one of said control members a substantially constant potential, means for impressing on the other of said control members a potential which varies in accordance with a predetermined controlling influence to control the currents in said circuits, and means responsive to the currents of said circuits.

8. In combination, an electric circuit, means for controlling said circuit, and means for controlling said first mentioned means in accordance with a predetermined controlling influence comprising a source of direct current, an electric valve means having a pair of electric discharge paths and control members therefor, a pair of electric circuits for controlling said first mentioned means and each being associated with a different one of said paths, an impedance element connected in series relation with both of said paths, means for impressing on the control member of one of said paths a substantially constant potential and means for impressing on the control member of the other of said paths a potential which varies in accordance with said controlling influence to control the currents in said pair of circuits.

9. In combination, an alternating current circuit, a translating device, electric valve means for controlling the energization of said translating device, and means for controlling said electric valve means comprising a source of direct current, a second electric valve means having a pair of electric discharge paths each including a control member for controlling the conductivity thereof, an impedance element connected in series relation with said discharge paths, a pair of circuits each associated with a different one of said discharge paths for controlling said first mentioned electric valve means, means for impressing a substantially constant potential on one of said control members and means for impressing on the other of said control members a potential which varies in accordance with a predetermined controlling influence to control said translating device therewith.

10. In combination, an alternating current supply circuit, a load circuit, means comprising two reversely connected electric valves connected between said supply circuit and said load circuit for controlling the amount and the direction of current transmitted to said load circuit, control circuits for said electric valves, a source of direct current, an electric valve means having a pair of electric discharge paths and control members therefor, a pair of electric circuits each energized from said source through a different discharge path for controlling said control circuits, an impedance element connected in series relation with said discharge paths, means for impressing on one of said control members a potential of substantially constant value, and means for impressing on the other of said control members a potential which varies in accordance with a predetermined controlling influence to control the currents in said pair of circuits.

11. In combination, an alternating current circuit, an electric valve means having control members, a load device connected to be energized from said circuit through said valve means, a source of direct current, a second electric valve means having a pair of electric discharge paths and a pair of control members each associated with a different one of said paths, a pair of electric circuits each connected to be energized from said source of direct current through a different one of said paths, means for impressing on one of said control members of said second electric valve means a substantially constant potential, means for impressing on the other of said control members of said second electric valve means a potential to control the current in said pair of circuits in accordance with a predetermined controlling influence, an impedance element connected in series relation with both of said paths, and excitation circuits associated with said first mentioned electric valve means to impress on the associated control members alternating voltages variable in phase in accordance with the currents of said pair of circuits.

12. In combination, an alternating current circuit, a load circuit, electric valve means interposed between said circuits and comprising control members for controlling the conductivities thereof, a source of direct current, an electric valve means comprising a pair of electric discharge paths each having a control member, a pair of electric circuits each associated with a different one of said paths, an impedance element connected in series relation with both of said paths, means for impressing on one of said control members of said paths a substantially constant potential, means for impressing on the other said control member of said paths a potential which varies in accordance with a predetermined controlling influence, and excitation circuits for impressing on the control members of said first mentioned electric valve means alternating voltages and comprising saturable inductive reactances responsive to the currents of said pair of circuits to control the phase of said alternating voltages.

13. In combination, a translating device, means for controlling said translating device, and a control system for controlling said means comprising a source of direct current, an electric valve means comprising a pair of electric discharge paths each including a control member, an impedance element connected in series relation with said discharge paths, a pair of electric circuits each associated with a different one of said paths and being connected to said first mentioned means, means for impressing on the control member of one of said paths a substantially constant potential and means for impressing on the control member of the other of said paths a potential which varies in accordance with a predetermined controlling influence to control the currents in said pair of paths.

14. In combination, an alternating current circuit, a load circuit, a pair of oppositely connected electric valve means for transmitting opposing currents to said load circuit, means for controlling said electric valve means to control the magnitude and direction of the resultant current transmitted to said load circuit and a saturable inductive device connected in series relation with said electric valve means and said load circuit to control the current transmitted thereto, said saturable inductive device being arranged to have a maximum impedance when the currents transmitted by said electric valve means are equal and arranged to have a substantially lower impedance when the current conducted by one of said electric valve means is substantially greater than the current conducted by the other electric valve means.

15. In combination, an alternating current circuit, a load circuit, electric valve means interposed between said circuits and comprising control members for controlling the conductivities thereof, a source of direct current, an electric valve means energized from said source and comprising a pair of electric discharge paths each having a control member, a pair of electric circuits each associated with a different one of said paths, an impedance element connected in series relation with both of said paths, means for impressing on one of said control members of said paths a substantially constant potential, means for impressing on the other control member of said paths a potential which varies in accordance with a predetermined controlling influence, and excitation circuits for impressing on the control members of said first mentioned electric valve means alternating voltages and comprising saturable inductive reactances including a control winding responsive to the currents of said pair of circuits to control the phase of said alternating voltages, said inductive reactances being arranged to maintain said first mentioned electric valve means nonconductive when the currents in said pair of circuits decrease below a predetermined value.

16. In combination, an alternating current circuit, a load circuit, a pair of electric valve means reversely connected in parallel and being interposed between said alternating current circuit and said load circuit for controlling the magnitude and direction of the resultant average direct current transmitted to said load circuit, said electric valve means each having a control member for controlling the conductivity thereof, a pair of excitation circuits each associated with a different one of said electric valve means and each comprising a saturable inductive reactance for impressing on the associated control member an alternating voltage variable in phase, and means for controlling said saturable inductive reactances.

17. In combination, an alternating current supply circuit, a load circuit, a pair of electric valve means reversely connected in parallel for controlling the magnitude and the direction of the average direct current transmitted to said load circuit, said electric valve means each having a control member for controlling the conductivity thereof, a pair of excitation circuits for impressing on said control members alternating voltages and each comprising a saturable inductive device for controlling the phase of said alternating voltages, and a voltage sensitive circuit for controlling said saturable inductive devices for shifting the phase of said alternating voltages in opposite directions with respect to the voltage of said supply circuit through substantially 180 electrical degrees.

18. In combination, a source of current, an electric valve means having a pair of electric discharge paths and a pair of control members each associated with a different one of said paths, a pair of electric circuits connected to be energized from said source and each being associated with a different one of said paths, means for impressing relatively variable potentials on the respective control members for controlling the currents in said pair of circuits, and an impedance element connected in series relation with both of said paths for controlling the voltage across said paths to maintain the sum of the currents in said electric circuits at a substantially constant value.

19. In combination, a source of current, electric valve means including a pair of electric discharge paths having an electrically-common cathode and each having a control member, a pair of electric circuits connected to be energized from said source and each being associated with a different one of said paths, means for impressing relatively variable potentials on the respective control members for controlling the currents in said pair of circuits, and an impedance element connected in series relation with both of said paths for controlling the potential of said cathode to maintain the sum of the currents in said pair of circuits at a substantially constant value.

WILLIAM D. COCKRELL.